US012738008B2

(12) United States Patent
Yang et al.

(10) Patent No.: US 12,738,008 B2
(45) Date of Patent: Sep. 15, 2026

(54) COMPUTER-READABLE RECORDING MEDIUM STORING REGION DETECTION PROGRAM, APPARATUS, AND METHOD

(71) Applicant: FUJITSU LIMITED, Kawasaki (JP)

(72) Inventors: Fan Yang, Edogawa (JP); Shigeyuki Odashima, Tama (JP)

(73) Assignee: Fujitsu Limited, Kawasaki (JP)

( * ) Notice: Subject to any disclaimer, the term of this patent is extended or adjusted under 35 U.S.C. 154(b) by 258 days.

(21) Appl. No.: 18/603,752

(22) Filed: Mar. 13, 2024

(65) Prior Publication Data

US 2024/0242464 A1 Jul. 18, 2024

Related U.S. Application Data

(63) Continuation of application No. PCT/JP2021/037958, filed on Oct. 13, 2021.

(51) Int. Cl.

*G06V 10/25* (2022.01)
*G06T 7/60* (2017.01)
*G06T 7/70* (2017.01)

(52) U.S. Cl.

CPC ................ *G06V 10/25* (2022.01); *G06T 7/60* (2013.01); *G06T 7/70* (2017.01); *G06V 2201/07* (2022.01)

(58) Field of Classification Search

CPC .............. G06V 10/25; G06T 7/70; G06T 7/60
See application file for complete search history.

(56) References Cited

U.S. PATENT DOCUMENTS 9,692,964 B2 * 6/2017 Steinberg ............... H04N 23/61
11,113,887 B2 * 9/2021 Kopeinigg ............. G06Q 10/40
(Continued)

FOREIGN PATENT DOCUMENTS

JP 2002-290962 A 10/2002
JP 2009-143722 A 7/2009
(Continued)

OTHER PUBLICATIONS

EESR—Extended European Search Report mailed on Oct. 28, 2024 for corresponding European Patent Application No. 21960618.3 [10 pages]. **JP2021-071749.
(Continued)

*Primary Examiner* — Mohammed H Zuberi
(74) *Attorney, Agent, or Firm* — Fujitsu Intellectual Property Center

(57) ABSTRACT

Avoiding False Negatives in vision-based multi-view gymnast detection presents a significant challenge. Detection results with False Negatives can further impact subsequent processing, such as multi-view 3D pose estimation. Therefore, interpolating missing bounding boxes is a desirable solution. Assuming that calibrated camera parameters are known, our method interpolates missing bounding boxes when a gymnast's 2D bounding boxes are detected in more than two views but are absent in others. This method primarily involves three steps: 1) Inferring the vertical 3D body center line using detected cross-view 2D bounding boxes and camera parameters through 2D-to-3D projection; 2) Obtaining the average 3D gymnast scale from pre-acquired data, and then calculating the 3D horizontal scale based on the 3D vertical scale obtained in step 1; 3) Interpolating the missing 2D bounding boxes using the inferred 3D vertical line and horizontal scale through 3D-to-2D projection.

7 Claims, 12 Drawing Sheets

(56) References Cited

U.S. PATENT DOCUMENTS

| | | | | |
|---|---|---|---|---|
| 11,227,194 | B2 * | 1/2022 | Zhang | G06T 7/80 |
| 11,270,347 | B2 * | 3/2022 | Lehman | G06Q 30/0261 |
| 11,282,282 | B2 * | 3/2022 | Simpkinson | G06F 3/011 |
| 11,373,318 | B1 * | 6/2022 | McKennoch | G06V 20/52 |
| 11,804,045 | B2 * | 10/2023 | Kudo | G06T 7/70 |
| 2012/0327197 | A1 | 12/2012 | Yamashita et al. | |
| 2016/0292533 | A1 | 10/2016 | Uchiyama et al. | |
| 2018/0341835 | A1 * | 11/2018 | Siminoff | G08B 13/19608 |
| 2019/0114824 | A1 | 4/2019 | Martinez | |
| 2019/0122378 | A1 | 4/2019 | Aswin | |
| 2019/0287310 | A1 * | 9/2019 | Kopeinigg | G06Q 50/01 |
| 2019/0356885 | A1 * | 11/2019 | Ribeiro | G06T 7/248 |
| 2022/0284672 | A1 | 9/2022 | Teranishi et al. | |

FOREIGN PATENT DOCUMENTS

| | | | |
|---|---|---|---|
| JP | 2018-132847 | A | 8/2018 |
| JP | 2021-071749 | A | 5/2021 |
| WO | 2021/100681 | A1 | 5/2021 |

OTHER PUBLICATIONS

WIPO, International Search Report with English-language translation and Written Opinion mailed Dec. 14, 2021, in connection with PCT/JP2021/037958.

Hideo Saito, et al., "View Interpolation of Multiple Cameras Based on Projective Geometry", 7 pages, 2002 Internet URL: https://www.researchgate.net/profile/Makoto-Kimura-7/publication/2840433_View_Interpolation_of_Multiple_Cameras_Based_on_Projective_Geometry/links/5518a09f0cf2f7d80a3e2d53/View-Interpolation-of-Multiple-Cameras-Based-on-Projective-Geometry.pdf?_tp=eyJjb250ZXh0Ijp7ImZpcnNOUGFnZSI6InB1YmxpY2F0aW9uIiwicGFnZSI6InB1YmxpY2F0aW9uIn19.

OpenCV, Intel Corporation, Ver.3.4, 1 page, 2017 "Triangulation—Structure from Motion" Internet URL: https://docs.opencv.org/3.4/d0/dbd/group_triangulation.html.

EPOA—Office Action mailed on Dec. 3, 2025 for European Patent Application No. 21960618.3 (6 pages). *WO2021/100681A1 EPOA was previously submitted in the IDS filed on Nov. 12, 2024.

* cited by examiner 90
301
VIEWPOINT 1
VIEWPOINT 2
VIEWPOINT 3
302
303
10
REGION DETECTION APPARATUS

FIG. 4

VIEWPOINT 1
421
401
402
VIEWPOINT 2
90
44
422
403
VIEWPOINT 3

FIG. 5

401
402
403
421
422
$[x^1+w^1/2, y^1]$
$[x^1+w^1/2, y^1+h^1]$
$[x^2+w^2/2, y^2]$
$[x^2+w^2/2, y^2+h^2]$
$P3d_{top}$
$P3d_{bot}$
PERSON CENTER LINE

Figure 11:
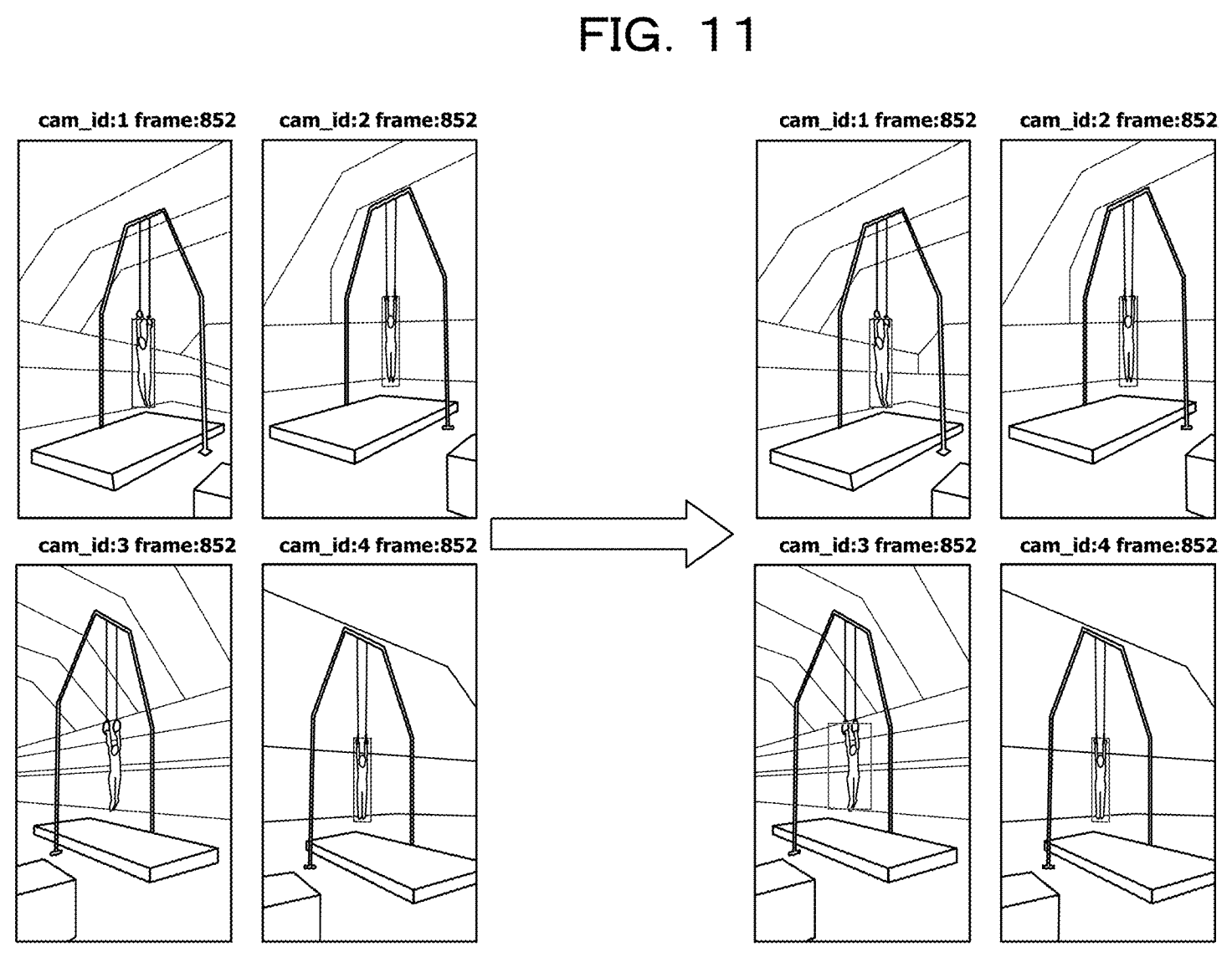

FIG. 11 cam_id:1 frame:852
cam_id:2 frame:852
cam_id:3 frame:852
cam_id:4 frame:852 cam_id:1 frame:852
cam_id:2 frame:852
cam_id:3 frame:852
cam_id:4 frame:852

FIG. 12

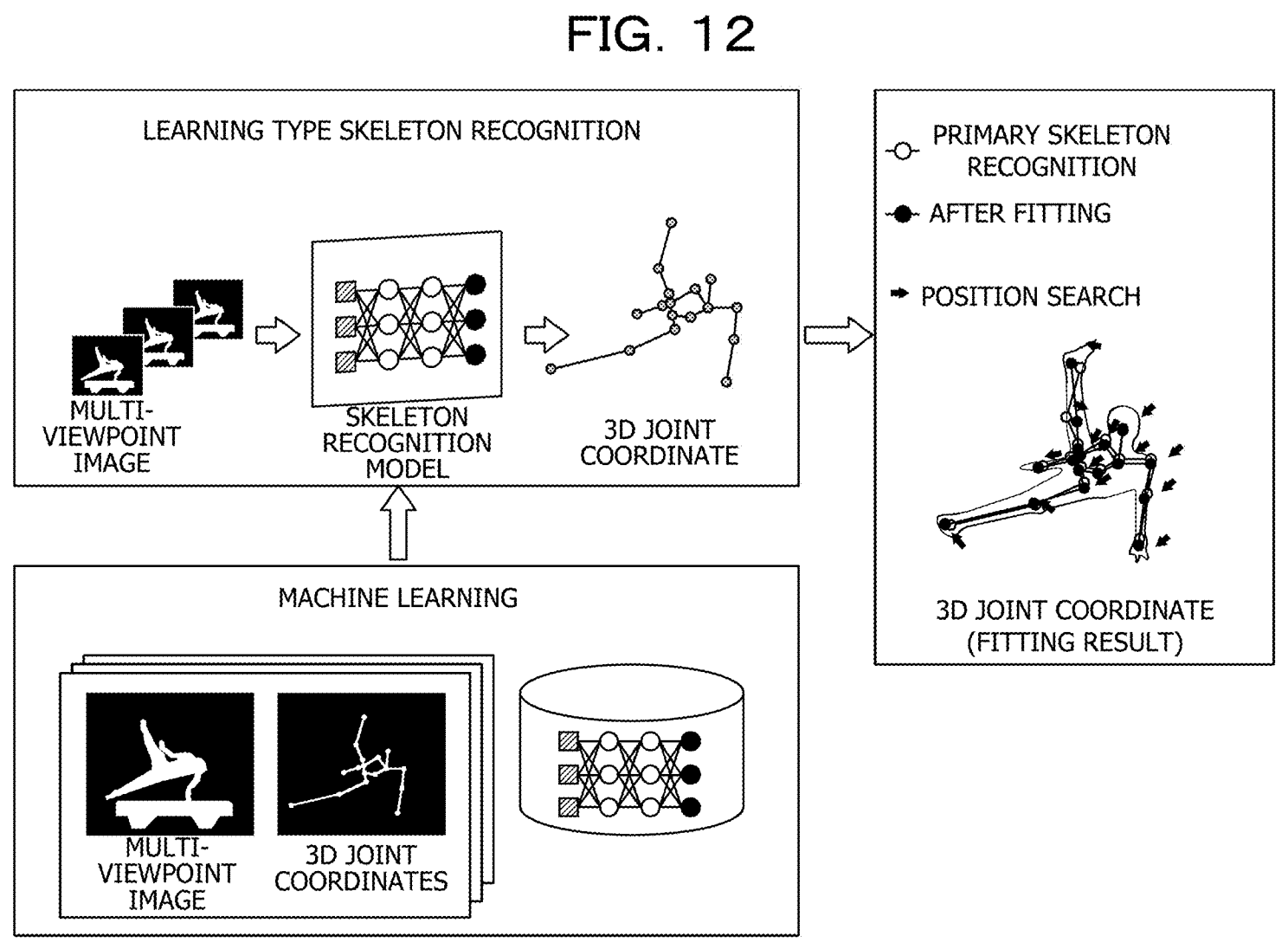

LEARNING TYPE SKELETON RECOGNITION

MULTI-VIEWPOINT IMAGE

SKELETON RECOGNITION MODEL

3D JOINT COORDINATE

MACHINE LEARNING

MULTI-VIEWPOINT IMAGE

3D JOINT COORDINATES

PRIMARY SKELETON RECOGNITION

AFTER FITTING

POSITION SEARCH

3D JOINT COORDINATE (FITTING RESULT)

COMPUTER-READABLE RECORDING MEDIUM STORING REGION DETECTION PROGRAM, APPARATUS, AND METHOD

CROSS-REFERENCE TO RELATED APPLICATION

This application is a continuation application of International Application PCT/JP2021/037958 filed on Oct. 13, 2021 and designated the U.S., the entire contents of which are incorporated herein by reference.

FIELD

The present technique relates to a region detection program, a region detection apparatus, and a region detection method.

BACKGROUND

Conventionally, there is a technique for recognizing three dimensional information of a person, such as skeletal information of the person, from an image obtained by capturing the person, using a recognition model generated in advance by machine learning. In such a technique, a bounding box surrounding a region of the person to be recognized is detected.

Related art is disclosed in Japanese Laid-Open Patent Publication No. 2021-071749 and Hideo Saito, Makoto Kimura, Satoshi Yaguchi, Naho Inamoto, "View Interpolation of Multiple Cameras Based on Projective Geometry", 2002.

SUMMARY

According to one aspect of the embodiment, a non-transitory computer-readable recording medium stores a region detection program for causing a computer to execute a process including: acquiring images each which is captured by each of a plurality of imaging apparatuses that capture the respective images of a person from respective different directions; detecting a region indicating the person from each of the images by inputting the images to a machine learning model which is generated in advance by a machine learning so as to detect the region indicating the person; and interpolating, based on a first region of the person which is detected from a first image of the images and a parameter of each of the plurality of imaging apparatuses, a second region indicating the person in a second image of the images.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram for explaining a difference in width of the two dimensional bounding box depending on a viewpoint;

FIG. 5 is a diagram for explaining the central lines of multi-view 2D bounding boxes correspond to the identical 3D central line;

FIG. 11 is a diagram illustrating an example of cross-view interpolation result;

FIG. 12 is a diagram for explaining this patent has been applied to multi-camera pose estimation applications.

DESCRIPTION OF EMBODIMENTS

For example, a 3D model generation apparatus that generates a 3D model of a subject from video captured by a plurality of cameras has been proposed. This apparatus acquires a silhouette image for each viewpoint from a multi-viewpoint video, and generates a low-resolution voxel model having a voxel size of a first size from a plurality of silhouette images by a view volume intersection method. Further, this apparatus classifies the low-resolution voxel model based on a feature thereof, and determines a second size smaller than the first size for each low-resolution voxel model based on a classification result. Further this apparatus generates a high-resolution voxel model having a voxel size of the second size for each 3D bounding box of the low-resolution voxel model, and outputs a 3DCG model of the subject based on the high-resolution voxel model.

There is also a technique for generating an image of an intermediate viewpoint by estimating corresponding points at another viewpoint from multi-viewpoint image captured from a plurality of viewpoints by using a perspective projection.

When detecting the bounding box as a region indicating a target person from an image by using a machine learning model, a case occurs sometimes in which the bounding box may not be detected or may be erroneously detected. If such non-detection or erroneous detection of the bounding box occurs in any image of the multi-viewpoint image for acquiring the three dimensional information of the person, the three dimensional information may not be accurately acquired in the subsequent processes.

In addition, for example, in a case where a person who may take various postures such as a gymnast is set as a target, there is a case where it is not possible to appropriately interpolate the bounding box which is not detected or is erroneously detected by simply applying the perspective projection.

In one aspect, the disclosed technique alms to appropriately interpolate the bounding box which is not detected or is erroneously detected in the multi-viewpoint image.

Hereinafter, an example of an embodiment according to the disclosed technique will be described with reference to the drawings. In the following embodiment, a case where a target person is a gymnast will be described, but the disclosed technique may be applied to various persons such as players of other sports or general pedestrians.

Figure 1:
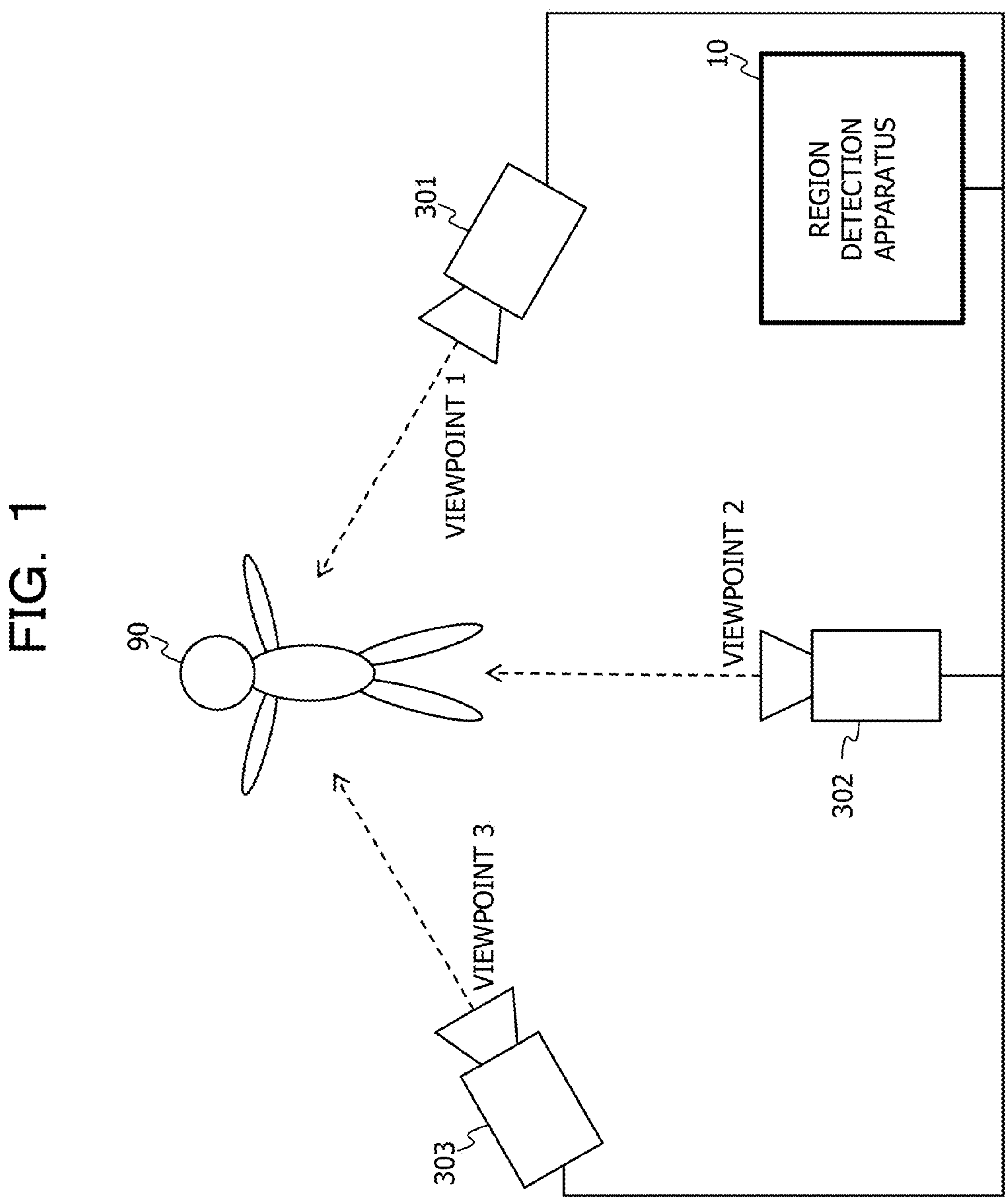
FIG. 1 is a schematic diagram illustrating multi-camera person capturing.

As illustrated in FIG. 1, the region detection apparatus 10 according to the present embodiment is coupled to each of a plurality of cameras 30*n* that capture images of a gymnast 90 at viewpoints n from respective different directions. In the example of FIG. 1, n=1, 2, 3, and a camera 301 that captures an image from a viewpoint 1, a camera 302 that captures an image from a viewpoint 2, and a camera 303 that captures an image from a viewpoint 3 are coupled to the region detection apparatus 10. Note that a number of cameras 30*n* coupled to the region detection apparatus 10 is not limited to the example of FIG. 1.

The cameras 30*n* are installed at different positions in substantially the same horizontal plane at an angle at which the gymnast 90 is within an imaging range. For example, the cameras 30*n* are arranged horizontally side by side so as to surround the gymnast 90. Note that, here, "substantially in the same horizontal plane" means a case where a height of the camera 30*n* from a floor surface may be regarded as substantially the same, and a case where a difference in the height of the camera 30*n* from the floor surface is equal to or less than a predetermined value. A video captured by the camera 30*n* is sequentially input to the region detection apparatus 10. Note that time information is associated with each frame included in the video captured by each camera 30*n*, and the video captured by each camera 30*n* may be synchronized based on this time information.

Figure 2:
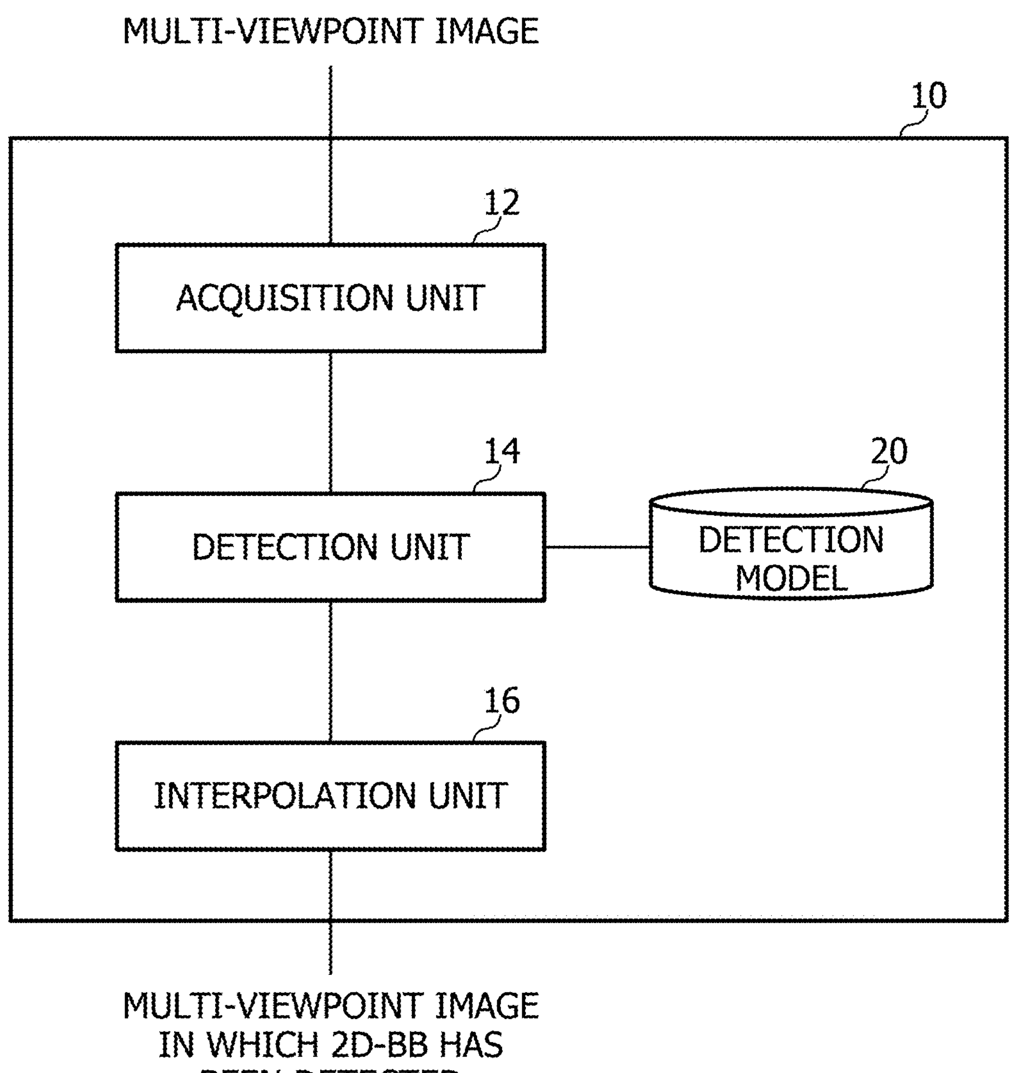
FIG. 2 is a pipeline diagram of the multi-camera person capturing.

As illustrated in FIG. 2, the region detection apparatus 10 functionally includes an acquisition unit 12, a detection unit 14, and an interpolation unit 16. Further, a detection model 20 is stored in a predetermined storage area of the region detection apparatus 10.

The acquiring unit 12 acquires, as a multi-viewpoint image, a set of images indicated by the frame corresponding to the time information in the video input from the camera 30*n* to the region detection apparatus 10. Hereinafter, among images included in the multi-viewpoint image, an image captured by the camera 30*n* is referred to as an image 40*n*.

Figure 3:
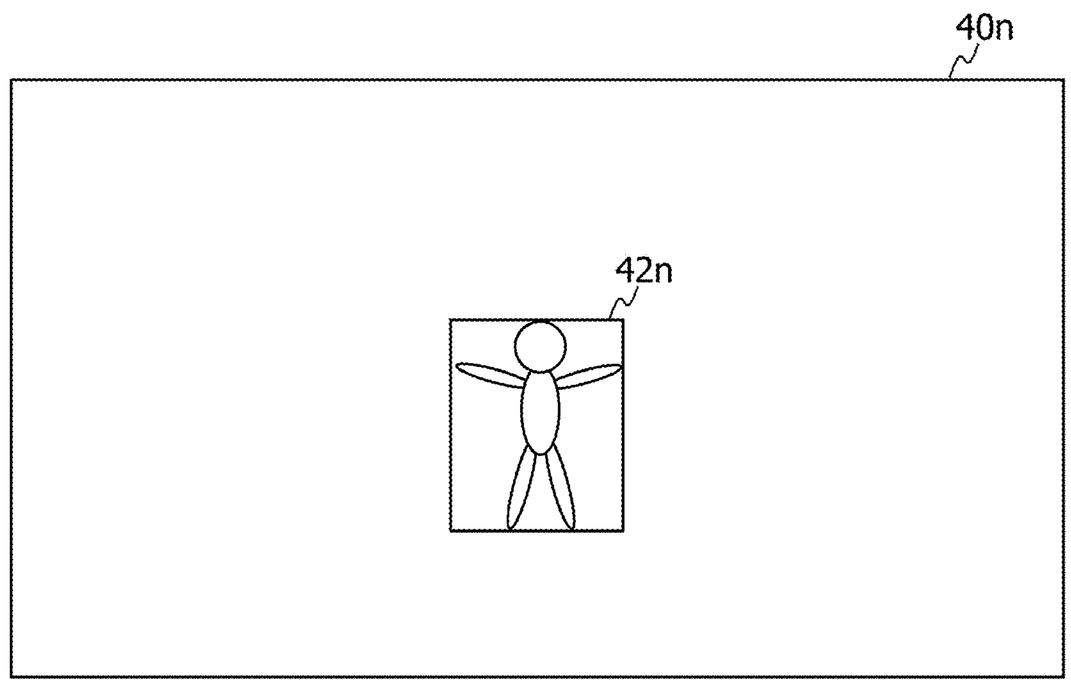
FIG. 3 is a diagram for explaining a two dimensional (2D) bounding box that covers a person.

The detecting unit 14 inputs the image 40*n* included in the multi-viewpoint image obtained by the obtaining unit 12 to the detection model 20, and detects a two dimensional boundary box (hereinafter, also referred to as "2D-BB") as a region indicating a person from each image 40*n*. The detection model 20 is generated in advance by using, as training data, images in which the correct the 2D-BB is given to images in which gymnasts in various postures are captured. Note that the detection model 20 is an example of a "machine learning model" of the disclosed technology. For example, as illustrated in FIG. 3, the detection unit 14 detects a circumscribed rectangle of a region indicating the gymnast 90 in the image 40*n* as 2D-BB42n.

The interpolation unit 16 interpolates the 2D-BB42n in a second image of the multi-viewpoint image based on a parameter of each camera 30*n* and the 2D-BB42n detected from a first image of the multi-viewpoint image. In the present embodiment, it is assumed that 2D-BB42k is detected from the image 30*k* captured by the camera 40*k* of the viewpoint k, and 2D-BB42_miss is not detected from the image 40_miss captured by the camera 30_miss of the viewpoint_miss. In this case, the image 40*k* is an example of the first image, and the image 40_miss is an example of the second image.

Here, when the detection model 20 which is the machine learning model is used as described above, the 2D-BB42n may not be detected or may be erroneously detected from the image 40*n*. This may occur when a part of the gymnast 90 in the image 40*n* is blocked by an obstacle, when the posture of the gymnast 90 who is a target is not similar to any of gymnasts in the image used for training the detection model 20, or the like. It is considered that three dimensional information of the gymnast 90 is acquired based on an image in the 2D-BB42n detected from each image 40*n* included in the multi-viewpoint image and a recognition model for recognizing the three dimensional information such as skeleton information generated in advance by machine learning. In this case, if an image in which the 2D-BB42n is not detected or is erroneously detected is included in the multi-viewpoint image, a recognition accuracy of the three dimensional information is reduced. Therefore, it is desirable to interpolate a BB42n that is not detected or is erroneously detected.

Figure 4:
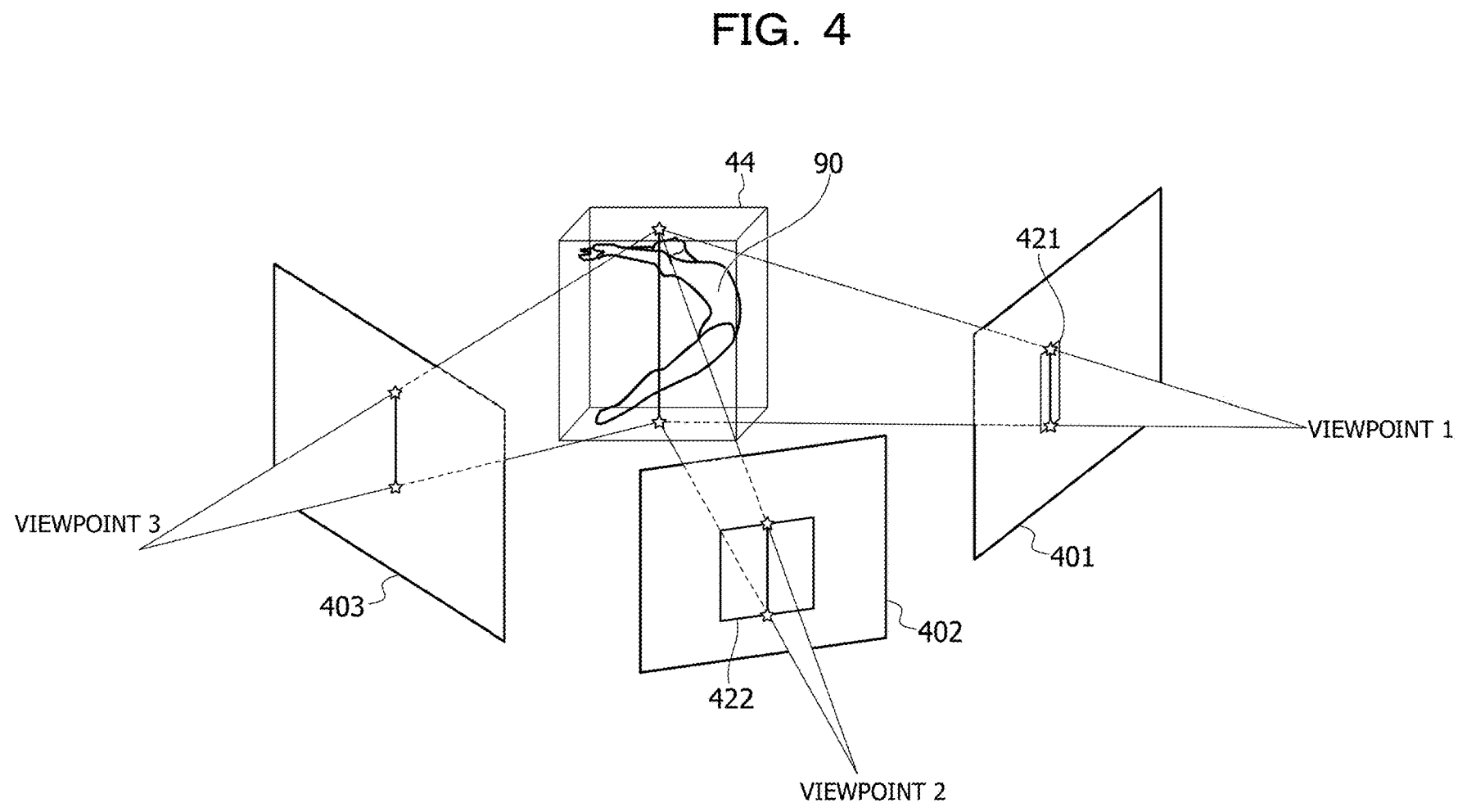

However, when a person who may take various postures, such as a gymnast, is a target, there is a case where it is not possible to appropriately interpolate the 2D-BB42n which is not detected or is erroneously detected by simply applying the perspective projection. This will be described in more detail with reference to FIG. 4. As illustrated in FIG. 4, a rectangular parallelepiped having horizontal and vertical surfaces and the smallest rectangular parallelepiped completely surrounding the gymnast 90 in a three dimensional space is assumed as a three dimensional bounding box (hereinafter, also referred to as "3D-BB") 44. At the viewpoint n of each camera 30*n*, the projection of 3D-BB44 onto each image 40*n* is the 2D-BB42n.

When the cameras 30*n* are arranged horizontally side by side so as to surround the gymnast 90, heights (vertical lengths) of the 2D-BB42n in each image 40*n* are the same regardless of the viewpoints of each camera 30*n*. Note that in FIG. 4, the heights of the 2D-BB42n and the heights of the 3D-BB44 are represented by lines coupling stars. On the other hand, widths (horizontal lengths) of the 2D-BB42n in each image 40*n* are different depending on the viewpoints of each camera 30*n*. In the example of FIG. 4, the width of the 2D-BB421 detected from an image 401 and the width of the 2D-BB422 detected from an image 402 are different due to the difference in the viewpoints. Therefore, for example, since the 2D-BB423 is not detected in an image 403, even if the perspective projection as in the related art is simply applied to interpolate from the detected the 2D-BB421 and the 2D-BB422, the widths of the 2D-BB423 may not be appropriately determined. Therefore, the 2D-BB423 in the image 403 cannot be interpolated.

Therefore, the interpolation unit 16 specifies the height of the 2D-BB42_miss in the image 40_miss in which the 2D-BB is not detected based on the height of 2D-BB42k in the image 40*k* in which the 2D-BB is detected and each parameter of the camera 30*k*. Then, the interpolation unit 16 estimates the width of the 2D-BB42_miss in the image 40_miss in which the 2D-BB is not detected, based on statistical information on the posture of the gymnast 90 and the parameter of the camera 30_miss.

Figure 5:
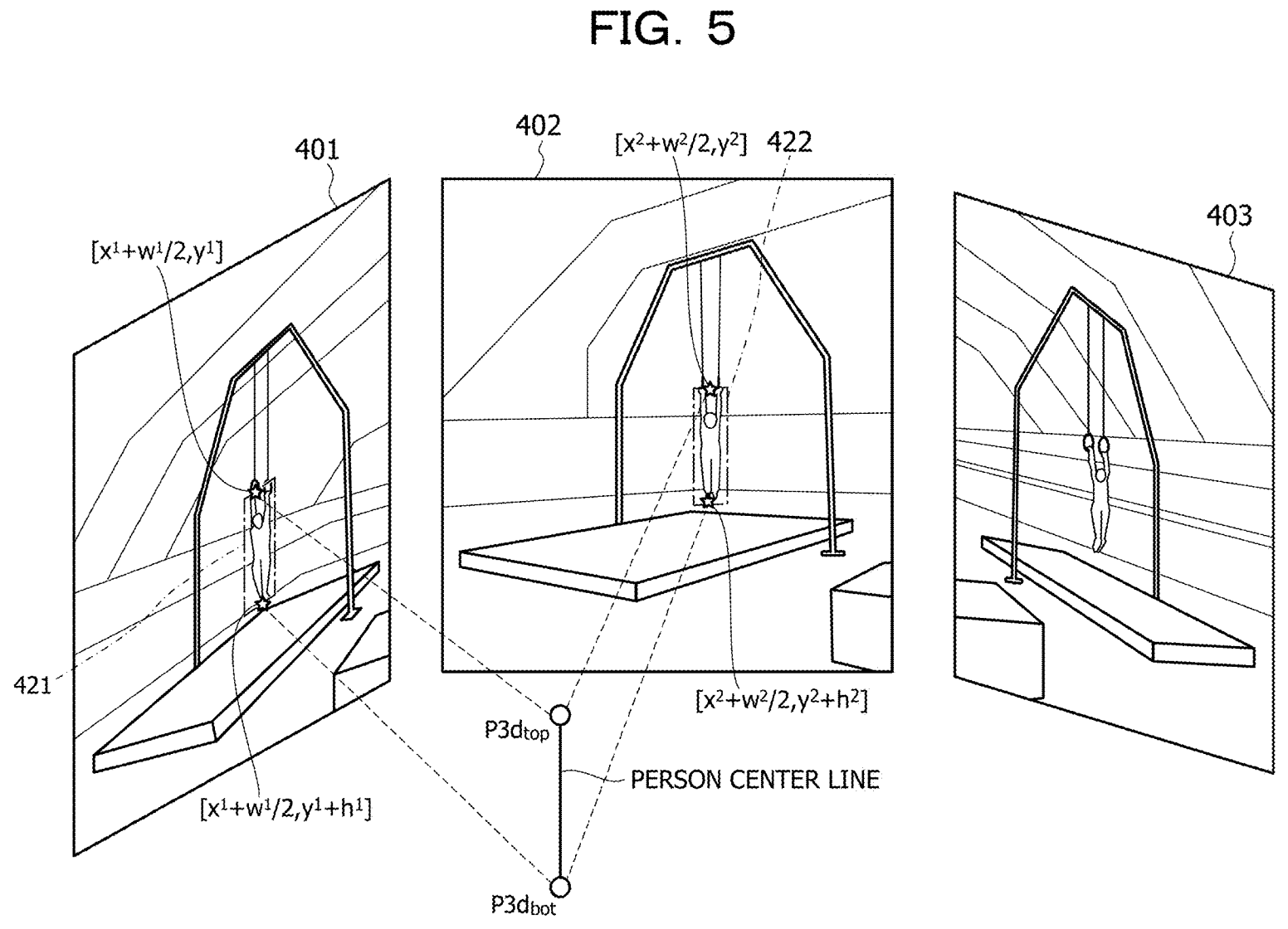

The description will be made in detail with reference to FIGS. 5 and 6. The interpolation unit 16 sets 2D-BB42k detected from the image 40*k* as $B^k=[x^k, y^k, w^k, h^k]$. $x^k$ and $y^k$ are coordinates in the image 40*k* of a point at the upper left corner of 2D-BB42k, and w and h are the width and height of 2D-BB42k, respectively. Further, the interpolation unit 16 also sets the 2DandBB42_miss in the image 40_miss to $B^{miss}=[x^{miss}, y^{miss}, w^{miss}, h^{miss}]$. For example, identifying the $B^{miss}$ corresponds to interpolating the 2D-BB42_miss. Note that, in the examples of FIGS. 5 and 6, "k=1, 2" is established and "_miss=3" is established.

The interpolation unit 16 specifies a coordinate $[x^k+w^k/2, y^k]$ of an upper end point of a vertical center line of 2D-BB42k and a coordinate $[x^k+w^k/2, y^k+h^k]$ of a lower end point. Then, the interpolation unit 16 converts the coordinates of the upper end point and the lower end point into three dimensional coordinates by using the parameter of the camera 30*k* for converting the three dimensional coordinates into coordinates on an image plane captured by the camera 30*k*. For example, the interpolator 16 may convert the coordinates using cv::sfm::trianglePoints defined in OpenCV (https://docs.opencv.org/3.4/d0/dbd/group_triangulation.html). In this case, the interpolation unit 16 calculates the three dimensional coordinates of points $P3d_{top}$ and $P3d_{bot}$ in the three dimensional space corresponding to the upper end point and the lower end point, respectively, as illustrated in the following Equations (1) and (2) using a parameter matrix $ProjMat_{cam\_k}$ of the camera 30*k*. Note that a line coupling $P3d_{top}$ and the $P3d_{bot}$ in the three dimensional space is referred to as a person center line.

$$P3d_{top} = [X_{top}, Y_{top}, Z_{top}] = cv::sfm::trianglePoints\left(\{[x^1+w^1/2, y^1], [x^2+w^2/2, y^2], \ldots, [x^k+w^k/2, y^k]\}, \{ProjMat_{cam\_1}, ProjMat_{cam\_2}, \ldots, ProjMat_{cam\_k}\}\right) \quad (1)$$

$$P3d_{bot} = [X_{bot}, Y_{bot}, Z_{bot}] = cv::sfm::trianglePoints\left(\{[x^1+w^1/2, y^1+h^1], [x^2+w^2/2, y^2+h^2], \ldots, [x^k+w^k/2, y^k+h^k]\}, \{ProjMat_{cam\_1}, ProjMat_{cam\_2}, \ldots, ProjMat_{cam\_k}\}\right) \quad (2)$$

Figure 6:
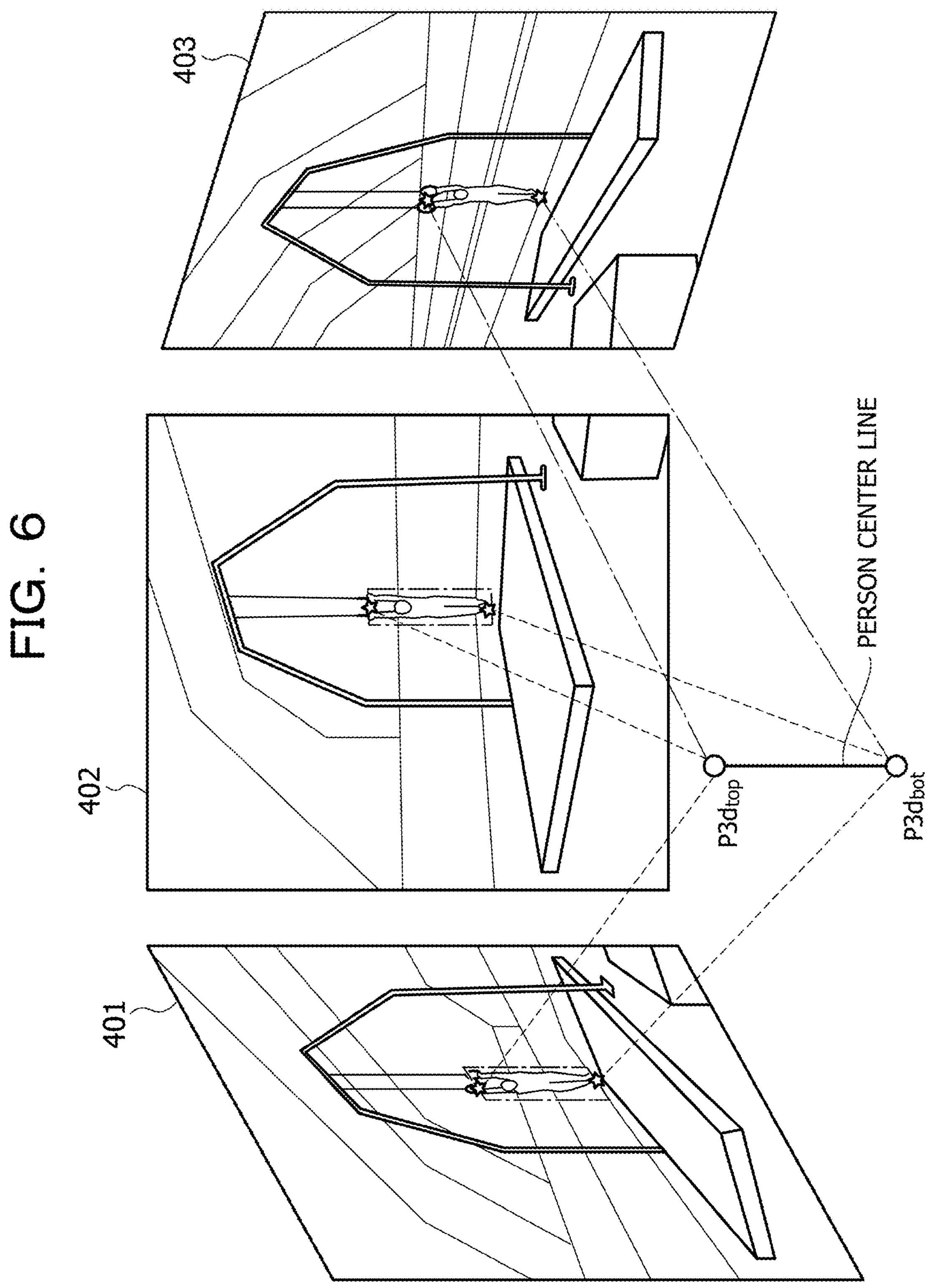
FIG. 6 is a diagram for explaining the central line of a missing 2D bounding box can be interpolated by projecting the 3D central line.

Further, the interpolation unit 16 converts the three dimensional coordinates of the $P3d_{top}$ and $P3d_{bot}$ into coordinates on the image 40_miss based on the parameter of the camera 30_miss, as illustrated in FIG. 6. Thus, the interpolation unit 16 calculates the coordinates of an upper end point and a lower end point of a vertical center line between the 2D-BB42_miss. For example, the interpolation unit 16 performs a coordinate conversion as illustrated in the following Equations (3) and (4) using a parameter matrix $ProjMat_{cam\_miss}$ of the camera 30_miss and a parameter s representing a scale ratio between the three dimensional coordinates and a size of the image 40.

$$[s\times(x^{miss}+w^{miss}/2), s\times y^{miss}, s] = ProjMat_{cam\_miss}\times[X_{top}, Y_{top}, Z_{top}, 1] \quad (3)$$

$$[s\times(x^{miss}+w^{miss}/2), s\times(y^{miss}+h^{miss}), s] = ProjMat_{cam\_miss}\times[X_{bot}, Y_{bot}, Z_{bot}, 1] \quad (4)$$

The interpolation unit 16 calculates $y^{miss}$, $h^{miss}$, and $x^{miss}+w^{miss}/2$ for specifying the coordinates of the upper end point and the lower end point of the vertical center line of 2D-BB42_miss based on the above-described coordinate conversion as illustrated in the following Equations (5) to (7).

$$y^{miss} = s\times y^{miss}/s \quad (5)$$

$$h^{miss} = s\times(y^{miss}+h^{miss})/s - y^{miss} \quad (6)$$

$$x^{miss}+w^{miss}/2 = s\times(x^{miss}+w^{miss}/2)/s \quad (7)$$

The interpolation unit 16 specifies a line coupling the specified upper end point and the specified lower end point as the vertical center line of the 2D-BB42_miss, and specifies a length of the vertical center line as the height of the 2D-BB42_miss.

Figure 7:
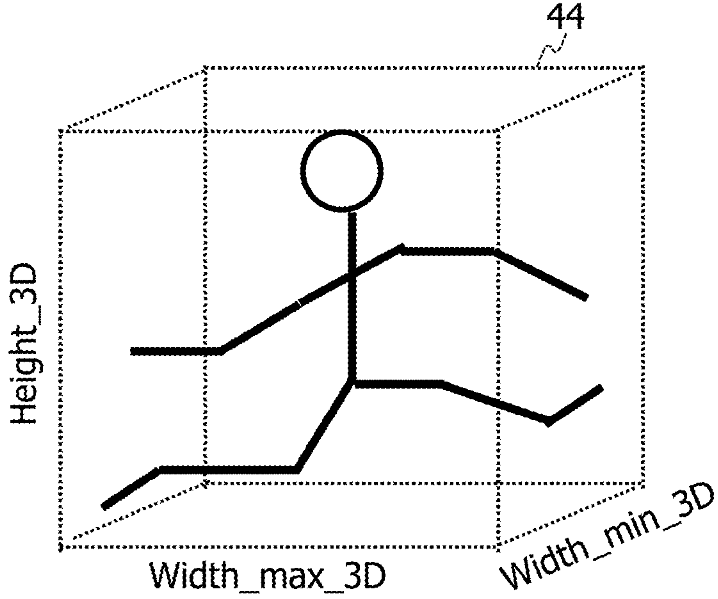
FIG. 7 is a diagram for explaining a width a height of a three dimensional bounding box.

Further, the interpolation unit 16 estimates the width of the 2D-BB42_miss based on the specified height of the 2D-BB42_miss and the statistical information related to the posture of the gymnast 90. The statistical information may be, for example, a mean of a sum of the height and the width of the 3D-BB44 surrounding the gymnast in each of the cases where the gymnast takes a plurality of different postures. In the following description, as illustrated in FIG. 7, the height of the 3D-BB44 is represented by Height_3D, the larger one of the widths is represented by Width_max_3D, and the smaller one is represented by Width_min_3D.

Figure 8:
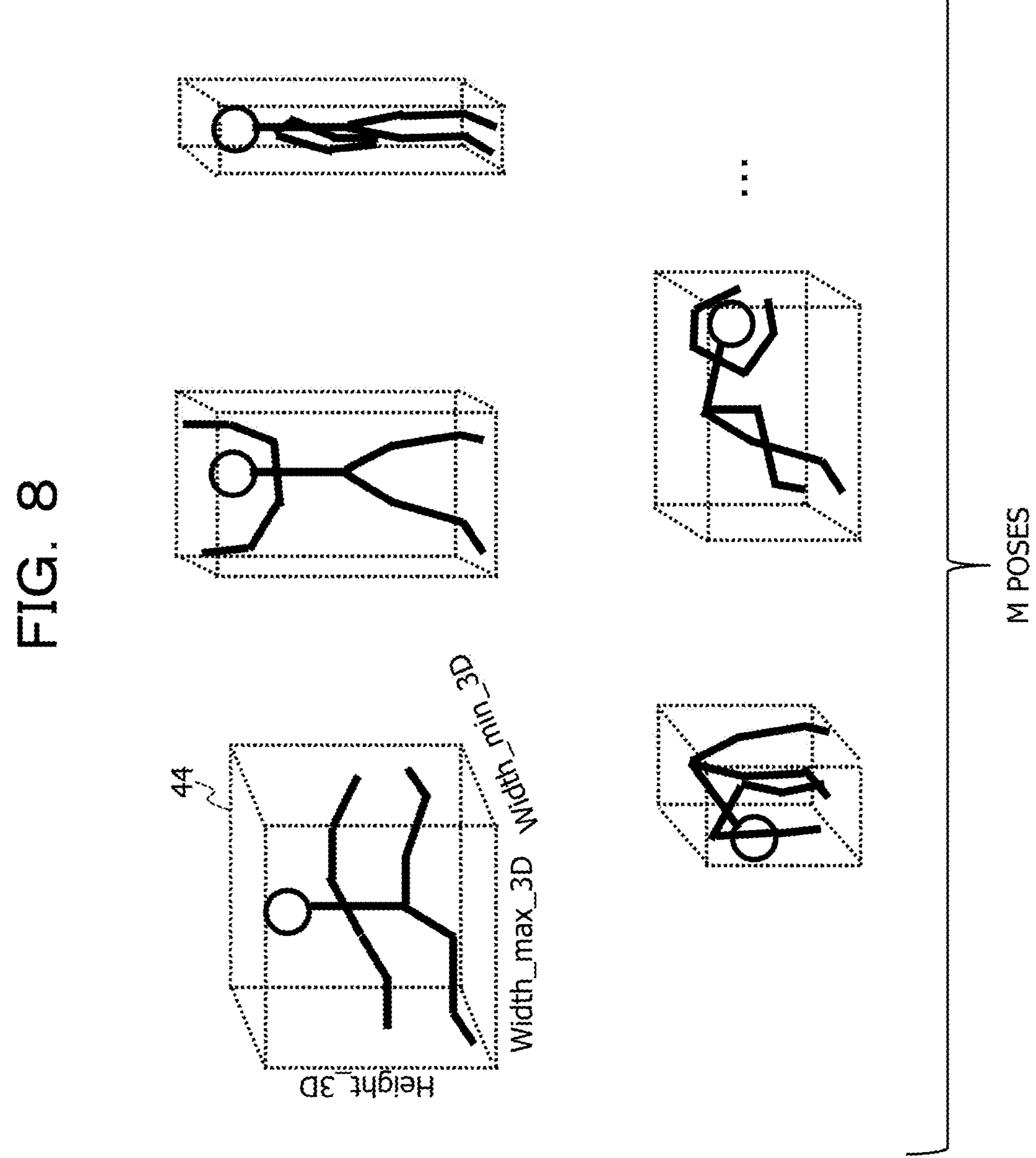
FIG. 8 is a diagram for explaining statistical information about the three dimensional bounding box.

The statistical information will be described in more detail. First, as illustrated in FIG. 8, a three dimensional model of a full-size gymnast are prepared for a plurality of postures (poses), which are acquired from a motion capture, a manual annotation, published data, and the like. In the example of FIG. 8, three dimensional models for M poses are prepared. Then, the 3D-BB44 is specified for each three dimensional model, each of the Height_3D, the Width_max_3D, and the Width_min_3D is calculated, and a mean Mean_3D illustrated in the following Equation (8) is calculated as the statistical information.

$$\text{Mean\_3D} = (1/M)\sum_M\left((\text{Width\_max\_3D}+\text{Width\_min\_3D})/2+\text{Height\_3D}\right) \quad (8)$$

The interpolation unit 16 calculates Width_3D of the 3D-BB44 of the gymnast 90 who is the target as illustrated in the following Equation (9) using the above-described statistical information Mean_3D and the $Z_{top}$ and $Z_{bot}$ which have been already calculated.

$$\text{Width\_3D} = \text{Mean\_3D} - \|Z_{top}-Z_{bot}\| \quad (9)$$

When perspectively projecting the 3D-BB onto the image, a ratio of the height and the width of the projected the 2D-BB is similar to a ratio of the height and the width of the 3D-BB before the projecting. Therefore, the interpolation unit 16 calculates the width $w^{miss}$ of the 2D-BB42_miss as illustrated in the following Equation (10) using the calculated Width_3D and the already-calculated $Z_{top}$, $Z_{bot}$, and $h^{miss}$. Further, the interpolation unit 16 calculates the $x^{miss}$ by the calculated $w^{miss}$ and Equation (7) as illustrated in Equation (11) below.

$$w^{miss} = (\text{Width\_3D}/\|Z_{top}-Z_{bot}\|)\times h^{miss} \quad (10)$$

$$x^{miss} = x^{miss}+w^{miss}/2 - w^{miss}/2 \quad (11)$$

The interpolation unit 16 interpolates the 2D-BB42_miss specified by $[x^{miss}, y^{miss}, w^{miss}, h^{miss}]$ calculated by Equations (5), (6), (10), and (11) in the image 40_miss. Then, the interpolation unit 16 outputs the interpolated 2D-BB42_miss and 2D-BB42k together as a multi-viewpoint image in which the 2D-BB has been detected.

Figure 9:
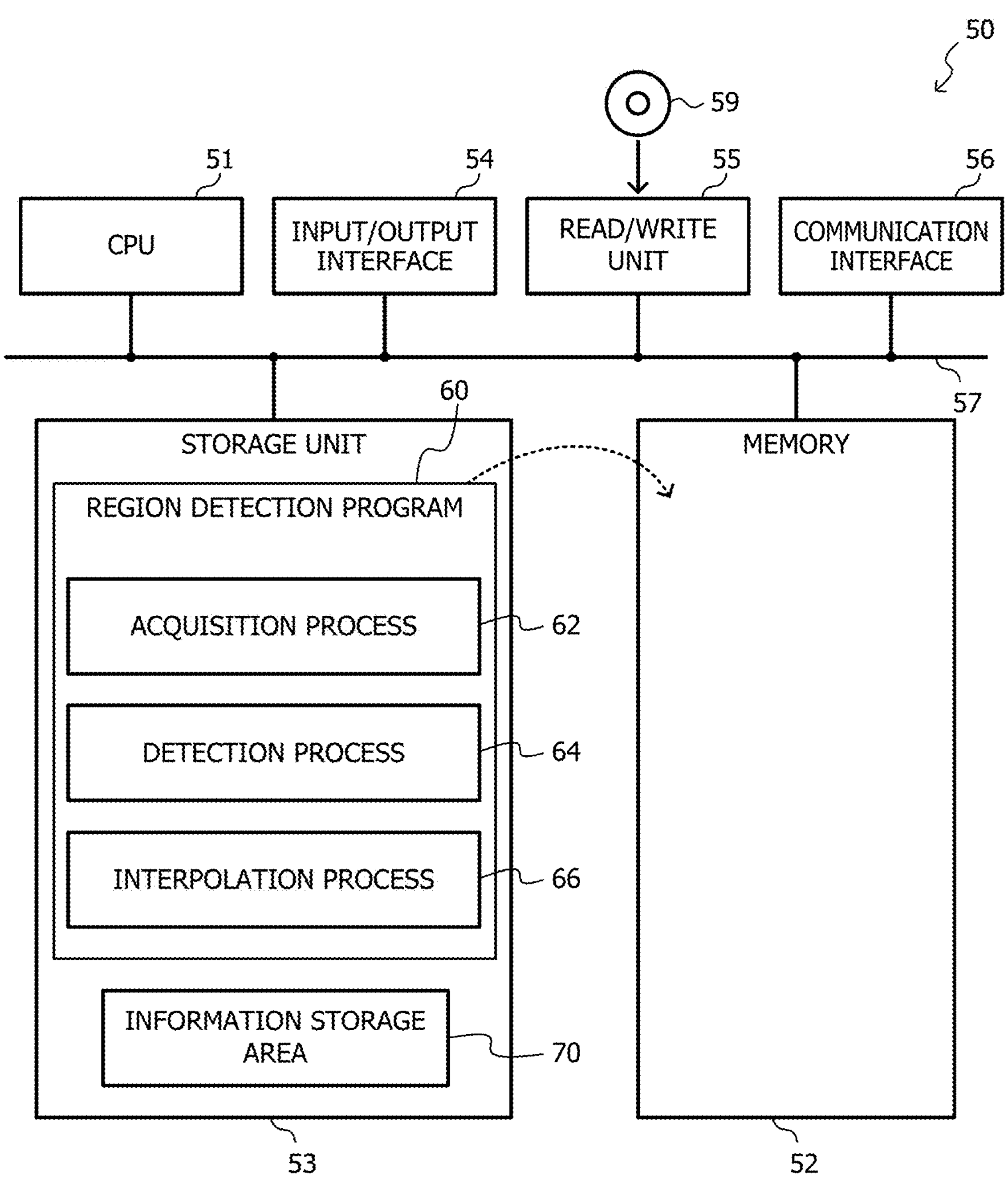
FIG. 9 is a block diagram illustrating a schematic configuration of a computer functioning as the region detection apparatus.

The region detection apparatus 10 may be implemented by, for example, a computer 50 illustrated in FIG. 9. The computer 50 includes a central processing unit (CPU) 51, a memory 52 as a temporary storage area, and a nonvolatile storage unit 53. The computer 50 further includes an input/output interface (I/F) 54 to which external devices such as a camera 30*n*, an input device, and a display are coupled, and a read/write (R/W) unit 55 that controls reading and writing of data from and to a storage media 59. Further, the computer 50 includes a communication I/F 56 coupled to a network such as a Internet. The CPU 51, the memory 52, the storage unit 53, the input/output I/F 54, the R/W unit 55, and the communication I/F 56 are coupled to each other via a bus 57.

The storage unit 53 may be realized by a hard disk drive (HDD), a solid state drive (SSD), a flash memory, or the like. The storage unit 53 as a storage medium stores an area detection program 60 for causing the computer 50 to function as the area detection apparatus 10. The region detection program 60 includes an acquisition process 62, a detection process 64, and an interpolation process 66. Further, the storage unit 53 includes an information storage area 70 in which information constituting the detection model 20 is stored.

The CPU 51 reads the region detection program 60 from the storage unit 53, develops the region detection program 60 in the memory 52, and sequentially executes processes included in the region detection program 60. The CPU 51 operates as the acquisition unit 12 illustrated in FIG. 2 by executing the acquisition process 62. Further, the CPU 51 operates as the detection unit 14 illustrated in FIG. 2 by executing the detection process 64. Further, the CPU 51 operates as the interpolation unit 16 illustrated in FIG. 2 by executing the interpolation process 66. Further, the CPU 51 reads information from the information storage area 70 and develops the detection model 20 in the memory 52. Thus, the computer 50 that executes the region detection program 60 functions as the region detection apparatus 10. Note that the CPU 51 that executes the program is hardware.

Note that functions implemented by the region detection program 60 may be implemented by, for example, a semiconductor integrated circuit, for example, a graphics processing unit (GPU), an application specific integrated circuit (ASIC), or the like.

Next, an operation of the region detection apparatus 10 according to the present embodiment will be described. When a multi-viewpoint image is input from the camera 30*n* to the region detection apparatus 10, the region detection apparatus 10 performs a region detection process illustrated in FIG. 10. Note that the region detection process is an example of a region detection method of the disclosed technique.

In step S10, the acquisition unit 12 acquires a multi-viewpoint image input to the region detection apparatus 10. Next, in step S12, the detection unit 14 inputs each image 40*n* included in the acquired multi-viewpoint image to the detection model 20, and detects the 2D-BB42n from each image 40*n*. Next, in step S14, the detection unit 14 determines whether or not there is an image 40*n* in which the 2D-BB42n is not detected among the images 40*n* included in the multi-viewpoint image. If there is an image 40*n* in which the 2D-BB42n are not detected, the process proceeds to step S16, and if there is no image 40*n* in which the 2D-BB42n is not detected, the process proceeds to step S24.

In step S16, the interpolation unit 16 specifies the coordinate $[x^k+w^k/2, y^k]$ of the upper end point of the vertical center line of the detected 2D-BB42k and the coordinate $[x^k+w^k/2, y^k+h^k]$ of the lower end point of the vertical center line. Next, in step S18, the interpolation unit 16 specifies the points $P3d_{top}$ and $P3d_{bot}$ obtained by converting the coordinates of the upper end point and the lower end point into the three dimensional coordinates using the parameter matrix of the camera 30*k* (denoted as "OK camera" in FIG. 10). Then, the interpolation unit 16 specifies the line coupling the $P3d_{top}$ and the $P3d_{bot}$ as the person center line.

Figure 10:
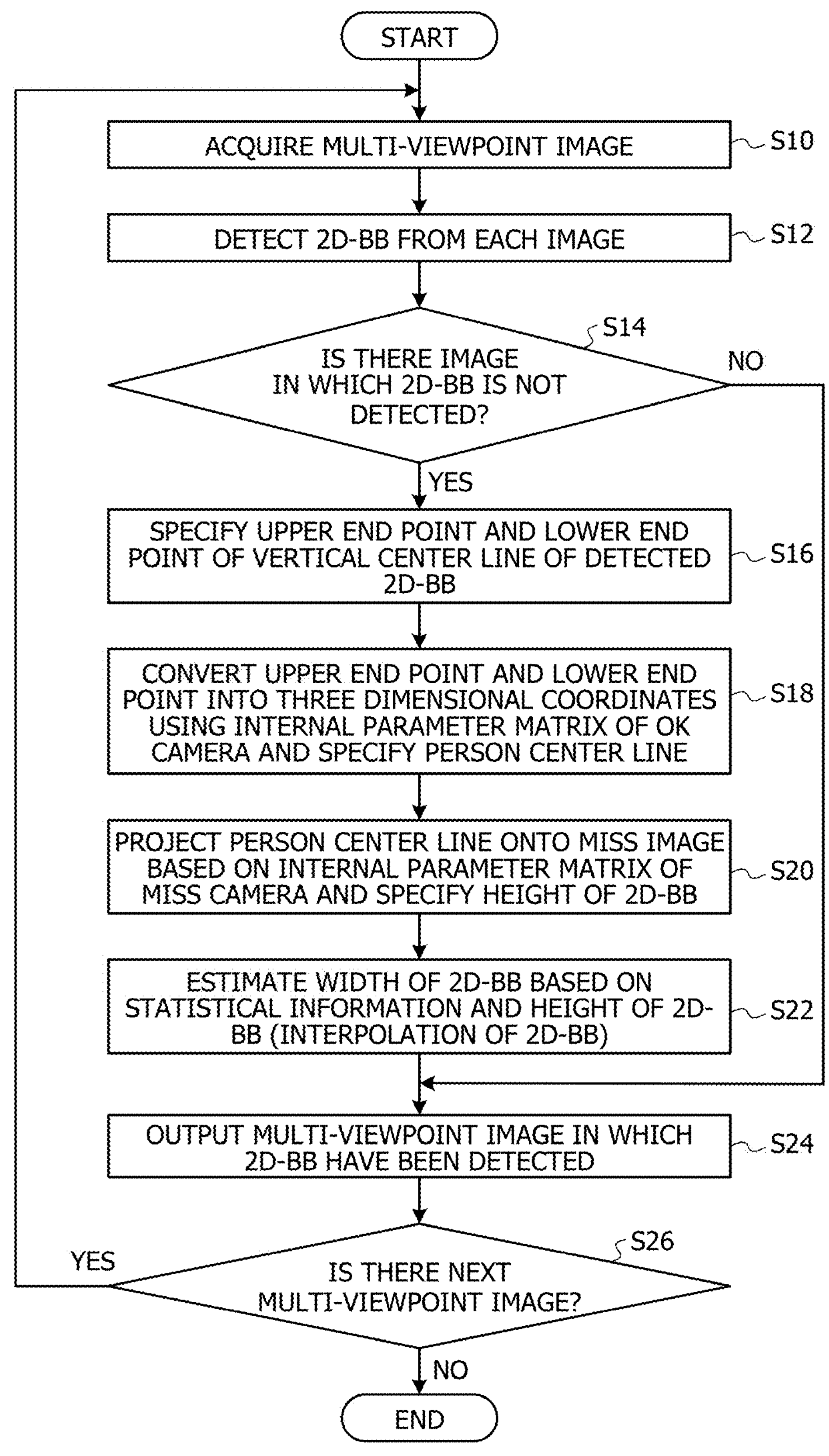
FIG. 10 is a flowchart illustrating an example of a region detection process.

Next, in step S20, the interpolation unit 16 projects the three dimensional coordinates of the $P3d_{top}$ and $P3d_{bot}$ onto the image 40_miss (denoted as "miss image" in FIG. 10) based on the parameter matrix of the camera 30_miss (denoted as "miss camera" in FIG. 10). Thus, the vertical center line of the 2D-BB42_miss is specified, and the length of the vertical center line is specified as the height of the 2D-BB42_miss.

Next, in step S22, the interpolation unit 16 estimates the width of the 2D-BB42_miss based on the specified height of the 2D-BB42_miss and the statistical information about the posture of the gymnast 90. Thus, the 2D-BB42_miss specified by the vertical center line and the height of the 2D-BB42_miss which are specified in step S20 and the width of the 2D-BB42_miss which is estimated in this step are interpolated in the image 40_miss.

Next, in step S24, the interpolation unit 16 outputs a multi-viewpoint image in which the 2D-BB42n is detected from each image 40*n*. The detected 2D-BB42n includes the 2D-BB interpolated in the above step S22. Next, in step S26, the acquisition unit 12 determines whether or not a next multi-viewpoint image is input to the region detection apparatus 10. When the next multi-viewpoint image is input to the region detection apparatus 10, the process returns to step S10, and when the next multi-viewpoint image is not input, the region detection process is terminated.

FIG. 11 illustrates an example of an interpolation of the 2D-BB that has not been detected in a multi-viewpoint image including four images. In FIG. 11, cam_id:n (n=1, 2, 3, 4) represents an image captured by a camera having an id of n. Further, frame:852 is a frame number associated with each image, and corresponds to the time information in the above-described embodiment. 2D_BB that is missing in cam_id:3 included in the multi-viewpoint image of a frame number 852 as illustrated in the left diagram of FIG. 11 is interpolated as illustrated in the right diagram of FIG. 11 by applying the present embodiment.

As described above, the region detection apparatus according to the present embodiment acquires a multi-viewpoint image that is a set of images captured by a plurality of cameras that capture a person from each different direction. The region detection apparatus inputs each of the images included in the acquired multi-viewpoint image to a detection model generated in advance by machine learning so as to detect a bounding box indicating a region of the person included in the image, and detects the bounding box from each of the images. Then, the region detection apparatus interpolates, based on the bounding box detected from a first image among the acquired images and the parameter of each of the plurality of cameras, the bounding box in a second image among the acquired images.

For example, the region detection apparatus projects the detected 2D-BB from a two dimension to a three dimension using internal and external parameters of the camera, and determines a vertical person center line in the three dimensional space. Further, the region detection apparatus estimates a width of the 3D-BB based on statistical information indicating a mean of the height and width of the 3D-BB and the height of the 3D-BB which is the length of the person center line, which are calculated in advance from the three dimensional model of gymnasts in various postures. Further, the region detection apparatus interpolates the 2D-BB in the image by projecting the 3D_BB specified from the person center line and the height and width of the 3D-BB from the three dimension to the two dimension using the internal and external parameters of the camera. Thus, the undetected bounding box in the multi-viewpoint image may be appropriately interpolated.

The multi-viewpoint image in which the 2D-BB have been detected, which is output from the region detection apparatus according to the present embodiment, is used for a learning type skeleton recognition of a gymnast or the like, for example, as illustrated in FIG. 12. In the example of FIG. 12, a skeleton recognition model is generated in advance by machine learning using, as training data, a pair of a multi-viewpoint image in which the 2D-BB is known and a correct answer of a three dimensional coordinate of each joint of a gymnasts represented by the multi-view image (hereinafter, referred to as "3D joint coordinate"). The skeleton recognition model is, for example, a neural network. Then, when the multi-viewpoint image in which the 2D-BB have been detected, which is output from the region detection apparatus according to the present embodiment, is acquired as a multi-viewpoint image of a gymnast to be recognized, the multi-viewpoint image is input to the skeleton recognition model that has been subjected to machine learning, and the 3D joint coordinate is output. Then, the 3D joint coordinate output from the skeleton recognition model is used as a primary skeleton recognition result, and the 3D joint coordinate in which a position search of each joint position is performed based on a constraint such as a length and a positional relationship between the respective joints is output as a fitting result.

Further, in the above embodiment, the case where the plurality of cameras are arranged in substantially the same horizontal plane has been described, but the present disclosure is not limited thereto. For example, depending on a game played by a player, a multi-viewpoint image captured by a plurality of cameras which are arranged in substantially the same vertical plane may provide a more accurate recognition result in the skeleton recognition or the like. In this case, the width of the 3D-BB may be specified based on the width of the 2D-BB detected from the first image and the parameter of the camera that has captured the first image, and the height of the 3D-BB may be estimated based on the width of the 3D-BB and the statistical information related to the three dimensional model of the gymnast.

Further, in the above-described embodiment, the case where the first image is an image in which the 2D-BB is detected and the second image is an image in which 2D-BB is not detected, for example, the case where the 2D-BB is interpolated in an image in which the 2D-BB is missing has been described, but the present disclosure is not limited thereto. For example, each image included in the multi-viewpoint image may be set as the first image, the other images may be set as the second images, and the 2D-BB detected in the first image may be corrected based on the 2D-BB interpolated in the same manner as in the above-described embodiment. In addition, in a case where the detection model outputs, together with a detection of the bounding box, reliability of the detection and the reliability of the detection is equal to or less than a predetermined value, the case may be handled in the same manner as in the case where the 2D-BB is not detected in the above-described embodiment.

Further, in the above-described embodiment, the region detection program is stored (installed) in the storage unit in advance, but the present disclosure is not limited thereto. The program according to the disclosed technique may be provided in a form stored in a storage medium such as a CD-ROM, a DVD-ROM, or a USB memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a region detection program for causing a computer to execute a process comprising:

acquiring images each which is captured by each of a plurality of imaging apparatuses that are arranged in the same horizontal plane and capture the respective images of a person from respective different directions;

detecting a region indicating the person from each of the images by inputting the images to a machine learning model which is generated in advance by a machine learning so as to detect the region indicating the person; and interpolating, based on a first region of the person which is detected from a first image in which the region indicating the person is detected by the machine learning model in the images and a parameter of each of the plurality of imaging apparatuses, a second region indicating the person in a second image in which the region indicating the person is not detected by the machine learning model in the images, a width of the second region being estimated based on a height of the first region, and a height of the second region estimated by converting an end point of a vertical center line of the first region into a coordinate of an end point of a vertical center line of the person in a three dimensional space based on the parameter of an imaging apparatus which captures the first image and converting the coordinate into a coordinate in the second image based on the parameter of an imaging apparatus which captures the second image, and statistical information regarding a posture of the person, and the statistical information regarding a posture of the person being a mean of a sum of a height and a width of a rectangular parallelepiped surrounding the person in each of a plurality of different postures of the person.

2. The non-transitory computer-readable recording medium according to claim 1, wherein a length of the vertical center line of the person in the three dimensional space is set as a height of the person in the three dimensional space, a difference between the mean indicated by the statistical information and the height of the person in the three dimensional space is estimated as a width of the person in the three dimensional space and the width of the second region is estimated based on a ratio of the height and the width of the person in the three dimensional space and the height of the second region.

3. The non-transitory computer-readable recording medium according to claim 1, wherein the plurality of imaging apparatuses are arranged in a same vertical plane, and a height of the second region is estimated based on a width of the first region, a width of the second region, and statistical information regarding a posture of the person.

4. A region detection apparatus comprising:

a memory; and a processor coupled to the memory and configured to:

acquire images each which is captured by each of a plurality of imaging apparatuses that are arranged in the same horizontal plane and capture the respective images of a person from respective different directions;

detected a region indicating the person from each of the images by inputting the images to a machine learning model which is generated in advance by a machine learning so as to detect the region indicating the person; and interpolate, based on a first region of the person which is detected from a first image in which the region indicating the person is detected by the machine learning model in the images and a parameter of each of the plurality of imaging apparatuses, a second region indicating the person in a second image in which the region indicating the person is not detected by the machine learning model in the images, a width of the second region being estimated based on a height of the first region, and a height of the second region estimated by converting an end point of a vertical center line of the first region into a coordinate of an end point of a vertical center line of the person in a three dimensional space based on the parameter of an imaging apparatus which captures the first image and converting the coordinate into a coordinate in the second image based on the parameter of an imaging apparatus which captures the second image, and statistical information regarding a posture of the person, and the statistical information regarding a posture of the person being a mean of a sum of a height and a width of a rectangular parallelepiped surrounding the person in each of a plurality of different postures of the person.

5. The region detection apparatus according to claim 4, wherein a length of the vertical center line of the person in the three dimensional space is set as a height of the person in the three dimensional space, a difference between the mean indicated by the statistical information and the height of the person in the three dimensional space is estimated as a width of the person in the three dimensional space and the width of the second region is estimated based on a ratio of the height and the width of the person in the three dimensional space and the height of the second region.

6. The region detection apparatus according to claim 4, wherein the plurality of imaging apparatuses are arranged in a same vertical plane, and a height of the second region is estimated based on a width of the first region, a width of the second region, and statistical information regarding a posture of the person.

7. A region detection method for executing a process comprising:

acquiring images each which is captured by each of a plurality of imaging apparatuses that are arranged in the same horizontal plane and capture the respective images of a person from respective different directions;

detecting a region indicating the person from each of the images by inputting the images to a machine learning model which is generated in advance by a machine learning so as to detect the region indicating the person; and interpolating, based on a first region of the person which is detected from a first image in which the region indicating the person is detected by the machine learning model in the images and a parameter of each of the plurality of imaging apparatuses, a second region indicating the person in a second image in which the region indicating the person is not detected by the machine learning model in the images, a width of the second region being estimated based on a height of the first region, and a height of the second region estimated by converting an end point of a vertical center line of the first region into a coordinate of an end point of a vertical center line of the person in a three dimensional space based on the parameter of an imaging apparatus which captures the first image and converting the coordinate into a coordinate in the second image based on the parameter of an imaging apparatus which captures the second image, and statistical information regarding a posture of the person, and the statistical information regarding a posture of the person being a mean of a sum of a height and a width of a rectangular parallelepiped surrounding the person in each of a plurality of different postures of the person.

* * * * *